(12) United States Patent
Huntington et al.

(10) Patent No.: US 9,784,140 B2
(45) Date of Patent: Oct. 10, 2017

(54) PROCESSING EXHAUST FOR USE IN ENHANCED OIL RECOVERY

(71) Applicants: Richard A. Huntington, Houston, TX (US); Robert D. Denton, Bellaire, TX (US); Patrick D. McMahon, The Woodlands, TX (US); Lalit K. Bohra, Spring, TX (US); Jasper L. Dickson, Houston, TX (US)

(72) Inventors: Richard A. Huntington, Houston, TX (US); Robert D. Denton, Bellaire, TX (US); Patrick D. McMahon, The Woodlands, TX (US); Lalit K. Bohra, Spring, TX (US); Jasper L. Dickson, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 430 days.

(21) Appl. No.: 14/188,545

(22) Filed: Feb. 24, 2014

(65) Prior Publication Data

US 2014/0250912 A1 Sep. 11, 2014

Related U.S. Application Data

(60) Provisional application No. 61/775,167, filed on Mar. 8, 2013.

(51) Int. Cl.
*E21B 43/24* (2006.01)
*F01K 23/10* (2006.01)
(Continued)

(52) U.S. Cl.
CPC .............. *F01K 23/10* (2013.01); *F01K 13/00* (2013.01); *F01K 17/025* (2013.01); *F01K 23/14* (2013.01);
(Continued)

(58) Field of Classification Search
CPC .............. F01K 23/10; F02C 6/18; E21B 43/24
(Continued)

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2645450 9/2007
(Continued)

OTHER PUBLICATIONS

U.S. Appl. No. 14/173,683, filed Feb. 5, 2014, Veerappan, Muthaiah et al.
(Continued)

*Primary Examiner* — Brian D Nash
(74) *Attorney, Agent, or Firm* — ExxonMobil Upstream Research Company Law Department

(57) ABSTRACT

A method for generating steam for hydrocarbon production is provided. The method includes producing steam using heat from an exhaust stream from a gas turbine system. A water stream is condensed from combustion products in the exhaust stream, and the water stream is used as a make-up water for production of the steam.

30 Claims, 7 Drawing Sheets

(51) Int. Cl.
*F02C 6/18* (2006.01)
*F01K 13/00* (2006.01)
*F01K 17/02* (2006.01)
*F01K 23/14* (2006.01)

(52) U.S. Cl.
CPC .............. *F02C 6/18* (2013.01); *Y02E 20/14* (2013.01); *Y02E 20/16* (2013.01); *Y02E 20/326* (2013.01); *Y02E 20/344* (2013.01)

(58) Field of Classification Search
USPC ........................................................ 60/783
See application file for complete search history.

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,116,275 A | 9/1978 | Butler et al. ................ 166/303 |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,262,745 A | 4/1981 | Stewart ...................... 166/263 |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,607,699 A | 8/1986 | Stephens ...................... 166/303 |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |

(56) References Cited

U.S. PATENT DOCUMENTS

| | | |
|---|---|---|
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |

(56) References Cited

U.S. PATENT DOCUMENTS

| | | |
|---|---|---|
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |

(56) References Cited

U.S. PATENT DOCUMENTS

| | | | |
|---|---|---|---|
| 7,943,097 B2 | 5/2011 | Golden et al. | |
| 7,955,403 B2 | 6/2011 | Ariyapadi et al. | |
| 7,966,822 B2 | 6/2011 | Myers et al. | |
| 7,976,803 B2 | 7/2011 | Hooper et al. | |
| 7,980,312 B1 | 7/2011 | Hill et al. | |
| 7,985,399 B2 | 7/2011 | Drnevich et al. | |
| 7,988,750 B2 | 8/2011 | Lee et al. | |
| 8,001,789 B2 | 8/2011 | Vega et al. | |
| 8,029,273 B2 | 10/2011 | Paschereit et al. | |
| 8,036,813 B2 | 10/2011 | Tonetti et al. | |
| 8,038,416 B2 | 10/2011 | Ono et al. | |
| 8,038,746 B2 | 10/2011 | Clark | |
| 8,038,773 B2 | 10/2011 | Ochs et al. | |
| 8,046,986 B2 | 11/2011 | Chillar et al. | |
| 8,047,007 B2 | 11/2011 | Zubrin et al. | |
| 8,051,638 B2 | 11/2011 | Aljabari et al. | |
| 8,061,120 B2 | 11/2011 | Hwang | |
| 8,062,617 B2 | 11/2011 | Stakhev et al. | |
| 8,065,870 B2 | 11/2011 | Jobson et al. | |
| 8,065,874 B2 | 11/2011 | Fong et al. | |
| 8,074,439 B2 | 12/2011 | Foret | |
| 8,080,225 B2 | 12/2011 | Dickinson et al. | |
| 8,083,474 B2 | 12/2011 | Hashimoto et al. | |
| 8,097,230 B2 | 1/2012 | Mesters et al. | |
| 8,101,146 B2 | 1/2012 | Fedeyko et al. | |
| 8,105,559 B2 | 1/2012 | Melville et al. | |
| 8,110,012 B2 | 2/2012 | Chiu et al. | |
| 8,117,825 B2 | 2/2012 | Griffin et al. | |
| 8,117,846 B2 | 2/2012 | Wilbraham | |
| 8,127,558 B2 | 3/2012 | Bland et al. | |
| 8,127,936 B2 | 3/2012 | Liu et al. | |
| 8,127,937 B2 | 3/2012 | Liu et al. | |
| 8,133,298 B2 | 3/2012 | Lanyi et al. | |
| 8,166,766 B2 | 5/2012 | Draper | |
| 8,167,041 B2 | 5/2012 | Chiesa et al. | 166/267 |
| 8,167,960 B2 | 5/2012 | Gil | |
| 8,176,982 B2 | 5/2012 | Gil et al. | |
| 8,191,360 B2 | 6/2012 | Fong et al. | |
| 8,191,361 B2 | 6/2012 | Fong et al. | |
| 8,196,387 B2 | 6/2012 | Shah et al. | |
| 8,196,413 B2 | 6/2012 | Mak | |
| 8,201,402 B2 | 6/2012 | Fong et al. | |
| 8,205,455 B2 | 6/2012 | Popovic | |
| 8,206,669 B2 | 6/2012 | Schaffer et al. | |
| 8,209,192 B2 | 6/2012 | Gil et al. | |
| 8,215,105 B2 | 7/2012 | Fong et al. | |
| 8,220,247 B2 | 7/2012 | Wijmans et al. | |
| 8,220,248 B2 | 7/2012 | Wijmans et al. | |
| 8,220,268 B2 | 7/2012 | Callas | |
| 8,225,600 B2 | 7/2012 | Theis | |
| 8,226,912 B2 | 7/2012 | Kloosterman et al. | |
| 8,240,142 B2 | 8/2012 | Fong et al. | |
| 8,240,153 B2 | 8/2012 | Childers et al. | |
| 8,245,492 B2 | 8/2012 | Draper | |
| 8,245,493 B2 | 8/2012 | Minto | |
| 8,247,462 B2 | 8/2012 | Boshoff et al. | |
| 8,257,476 B2 | 9/2012 | White et al. | |
| 8,261,823 B1 | 9/2012 | Hill et al. | |
| 8,262,343 B2 | 9/2012 | Hagen | |
| 8,266,883 B2 | 9/2012 | Dion Ouellet et al. | |
| 8,266,913 B2 | 9/2012 | Snook et al. | |
| 8,268,044 B2 | 9/2012 | Wright et al. | |
| 8,281,596 B1 | 10/2012 | Rohrssen et al. | |
| 8,316,665 B2 | 11/2012 | Mak | |
| 8,316,784 B2 | 11/2012 | D'Agostini | |
| 8,337,613 B2 | 12/2012 | Zauderer | |
| 8,347,600 B2 | 1/2013 | Wichmann et al. | |
| 8,348,551 B2 | 1/2013 | Baker et al. | |
| 8,371,100 B2 | 2/2013 | Draper | |
| 8,372,251 B2 | 2/2013 | Goller et al. | |
| 8,377,184 B2 | 2/2013 | Fujikawa et al. | |
| 8,377,401 B2 | 2/2013 | Darde et al. | |
| 8,388,919 B2 | 3/2013 | Hooper et al. | |
| 8,397,482 B2 | 3/2013 | Kraemer et al. | |
| 8,398,757 B2 | 3/2013 | Iijima et al. | |
| 8,409,307 B2 | 4/2013 | Drnevich et al. | |
| 8,414,694 B2 | 4/2013 | Iijima et al. | |
| 8,424,282 B2 | 4/2013 | Vollmer et al. | |
| 8,424,601 B2 | 4/2013 | Betzer-Zilevitch | |
| 8,430,947 B2 | 4/2013 | Latimer et al. | 95/158 |
| 8,436,489 B2 | 5/2013 | Stahlkopf et al. | |
| 8,453,461 B2 | 6/2013 | Draper | |
| 8,453,462 B2 | 6/2013 | Wichmann et al. | |
| 8,453,583 B2 | 6/2013 | Malavasi et al. | |
| 8,454,350 B2 | 6/2013 | Berry et al. | |
| 8,475,160 B2 | 7/2013 | Campbell et al. | |
| 8,539,749 B1 | 9/2013 | Wichmann et al. | |
| 8,567,200 B2 | 10/2013 | Brook et al. | |
| 8,616,294 B2 | 12/2013 | Zubrin et al. | |
| 8,627,643 B2 | 1/2014 | Chillar et al. | |
| 8,631,871 B2 | 1/2014 | Berruti | 166/303 |
| 9,062,690 B2 | 6/2015 | Gonzalez et al. | |
| 2001/0000049 A1 | 3/2001 | Kataoka et al. | |
| 2001/0029732 A1 | 10/2001 | Bachmann | |
| 2001/0045090 A1 | 11/2001 | Gray, Jr. | |
| 2002/0043063 A1 | 4/2002 | Kataoka et al. | |
| 2002/0053207 A1 | 5/2002 | Finger et al. | |
| 2002/0069648 A1 | 6/2002 | Levy et al. | |
| 2002/0187449 A1 | 12/2002 | Doebbeling et al. | |
| 2003/0005698 A1 | 1/2003 | Keller | |
| 2003/0131582 A1 | 7/2003 | Anderson et al. | |
| 2003/0134241 A1 | 7/2003 | Marin et al. | |
| 2003/0221409 A1 | 12/2003 | McGowan | |
| 2004/0006994 A1 | 1/2004 | Walsh et al. | |
| 2004/0068981 A1 | 4/2004 | Siefker et al. | |
| 2004/0166034 A1 | 8/2004 | Kaefer | |
| 2004/0170559 A1 | 9/2004 | Hershkowitz et al. | |
| 2004/0223408 A1 | 11/2004 | Mathys et al. | |
| 2004/0238654 A1 | 12/2004 | Hagen et al. | |
| 2005/0028529 A1 | 2/2005 | Bartlett et al. | |
| 2005/0072161 A1* | 4/2005 | Chen | F02C 3/30 60/775 |
| 2005/0144961 A1 | 7/2005 | Colibaba-Evulet et al. | |
| 2005/0197267 A1 | 9/2005 | Zaki et al. | |
| 2005/0229585 A1 | 10/2005 | Webster | |
| 2005/0236602 A1 | 10/2005 | Viteri et al. | |
| 2006/0112675 A1 | 6/2006 | Anderson et al. | |
| 2006/0158961 A1 | 7/2006 | Ruscheweyh et al. | |
| 2006/0183009 A1 | 8/2006 | Berlowitz et al. | |
| 2006/0196812 A1 | 9/2006 | Beetge et al. | |
| 2006/0248888 A1 | 11/2006 | Geskes | |
| 2007/0000242 A1 | 1/2007 | Harmon et al. | |
| 2007/0044475 A1 | 3/2007 | Leser et al. | |
| 2007/0044479 A1 | 3/2007 | Brandt et al. | |
| 2007/0089425 A1 | 4/2007 | Motter et al. | |
| 2007/0107430 A1 | 5/2007 | Schmid et al. | |
| 2007/0144747 A1 | 6/2007 | Steinberg | |
| 2007/0231233 A1 | 10/2007 | Bose | |
| 2007/0234702 A1 | 10/2007 | Hagen et al. | |
| 2007/0245736 A1 | 10/2007 | Barnicki | |
| 2007/0249738 A1 | 10/2007 | Haynes et al. | |
| 2007/0272201 A1 | 11/2007 | Amano et al. | |
| 2008/0000229 A1 | 1/2008 | Kuspert et al. | |
| 2008/0006561 A1 | 1/2008 | Moran et al. | |
| 2008/0010967 A1 | 1/2008 | Griffin et al. | |
| 2008/0034727 A1 | 2/2008 | Sutikno | |
| 2008/0038598 A1 | 2/2008 | Berlowitz et al. | |
| 2008/0047280 A1 | 2/2008 | Dubar | |
| 2008/0066443 A1 | 3/2008 | Frutschi et al. | |
| 2008/0115478 A1 | 5/2008 | Sullivan | |
| 2008/0118310 A1 | 5/2008 | Graham | |
| 2008/0127632 A1 | 6/2008 | Finkenrath et al. | |
| 2008/0155984 A1 | 7/2008 | Liu et al. | |
| 2008/0178611 A1 | 7/2008 | Ding | |
| 2008/0202123 A1 | 8/2008 | Sullivan et al. | |
| 2008/0223038 A1 | 9/2008 | Lutz et al. | |
| 2008/0250795 A1 | 10/2008 | Katdare et al. | |
| 2008/0251234 A1 | 10/2008 | Wilson et al. | |
| 2008/0289819 A1* | 11/2008 | Kaminsky | C01B 3/24 166/256 |
| 2008/0290719 A1 | 11/2008 | Kaminsky et al. | |
| 2008/0309087 A1 | 12/2008 | Evulet et al. | |
| 2009/0000762 A1 | 1/2009 | Wilson et al. | |
| 2009/0020456 A1 | 1/2009 | Tsangaris et al. | 208/133 |

(56) References Cited

U.S. PATENT DOCUMENTS

| | | |
|---|---|---|
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0137698 A1 | 6/2012 | Sjodin Mats ............ 60/774 |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2013/0312386 A1 | 11/2013 | Wirsum et al. ............ 60/39.182 |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | | |
|---|---|---|---|
| EP | 0162368 | 11/1985 | |
| EP | 0770771 | 5/1997 | |
| GB | 0776269 | 6/1957 | |
| GB | 2117053 | 10/1983 | |
| JP | 2003-074375 | 3/2003 | |
| JP | 2003-3 142 10 | 11/2003 | |
| WO | 1994/016992 | 8/1994 | |
| WO | WO9906674 | 2/1999 | |
| WO | WO9963210 | 12/1999 | |
| WO | WO2007068682 | 6/2007 | |
| WO | WO2008142009 | 11/2008 | |
| WO | WO2011003606 | 1/2011 | |
| WO | WO2012003489 | 1/2012 | |
| WO | WO2012128928 | 9/2012 | |
| WO | WO2012128929 | 9/2012 | |
| WO | WO2012170114 | 12/2012 | |
| WO | PCT/RU2013/000162 | 2/2013 | |
| WO | PCT/US13/036020 | 4/2013 | |
| WO | WO2013/095829 | 6/2013 | ............ E21B 43/16 |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

U.S. Appl. No. 14/175,715, filed Feb. 7, 2014, Huntington, R. A. et al.

U.S. Appl. No. 14/182,035, filed Feb. 7, 2014, Huntington, R. A. et al.

U.S. Appl. No. 14/182,048, filed Feb. 17, 2014, Huntington, R. A. et al.

U.S. Appl. No. 14/182,058, filed Feb. 17, 2014, Beutel, T. W. et al.

U.S. Appl. No. 14/188,545, filed Feb. 24, 2014, Huntington, R. A. et al.

U.S. Appl. No. 14/279,095, filed May 15, 2014, Moorkanikkara, S. N. et al.

U.S. Appl. No. 14/301,551, filed Jun. 11, 2014, Denton, Robert D. et a.

U.S. Appl. No. 14/301,979, filed Jun. 11, 2014, Subramaniyan, M. et al.

U.S. Appl. No. 14/302,028, filed Jun. 11, 2014, Zuo, Baifang et al.

U.S. Appl. No. 14/312,659, filed Jun. 23, 2014, Thatcher, J. C. et al.

U.S. Appl. No. 14/312,665, filed Jun. 23, 2014, Minto, K. D. et al.

U.S. Appl. No. 14/314,575, filed Jun. 25, 2014, Andrew, Philip L.

U.S. Appl. No. 14/314,601, filed Jun. 25, 2014, Vaezi, Vahid et al.

U.S. Appl. No. 14/321,690, filed Jul. 1, 2014, White, E. D. et al.

U.S. Appl. No. 14/444,601, filed Jul. 28, 2014, Slobodyanskiy, I. A. et al.

(56) References Cited

OTHER PUBLICATIONS

Ahmed, S. et al. (1998) "Catalytic Partial Oxidation Reforming of Hydrocarbon Fuels," 1998 Fuel Cell Seminar, 7 pgs.

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U.S. Dept. of Energy, Nat'l Energy Tech. Lab., DE-FC26-00NT 40804, 51 pgs.

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf, 22 pgs.

Cho, J. H. et al. (2005) "Marrying LNG and Power Generation," Energy Markets; 10, 8; ABI/INFORM Trade & Industry, 8 pgs.

Ciulia, Vincent. (2001-2003) "Auto Repair. How the Engine Works," http://autorepair.about.com/cs/generalinfo/a/aa060500a.htm, 1 page.

Clark, Hal (2002) "Development of a Unique Gas Generator for a Non-Polluting Power Plant," California Energy Commission Feasibility Analysis, P500-02-011F, 42 pgs.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers," Chem. Eng. Prog. Symp. Ser., 55 ( 21), 12 pgs.

Ditaranto, M. et al. (2006) "Combustion Instabilities in Sudden Expansion Oxy-Fuel Flames," ScienceDirect, Combustion and Flame, v.146, 19 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Eriksson, Sara. (2005) "Development of Methane Oxidation Catalysts for Different Gas Turbine Combustor Concepts," KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion $CO_2$ Capture," Elsevier, 34 pgs.

Evulet, Andrei T. et al. (2009) "On the Performance and Operability of GE's Dry Low $NO_x$ Combustors utilizing Exhaust Gas Recirculation for Post-Combustion Carbon Capture," Energy Procedia I, 7 pgs.

Foy, Kirsten et al. (2005) "Comparison of Ion Transport Membranes," Fourth Annual Conference on Carbon Capture and Sequestration, DOE/NETL; 11 pgs.

Luby, P. et al. (2003) "Zero Carbon Power Generation: IGCC as the Premium Option," Powergen International, 19 pgs.

MacAdam, S. et al. (2007) "Coal-Based Oxy-Fuel System Evaluation and Combustor Development," Clean Energy Systems, Inc.; presented at the $2^{nd}$ Int'l Freiberg Conf. on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annl. Conv. of the Gas Proc. of America (GPA 2007), San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al. (2001) "Advanced Steam Generators," National Energy Technology Lab., Pittsburgh, PA, and Morgantown, WV; NASA Glenn Research Center (US).

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

van Hemert, P. et al. (2006) "Adsorption of Carbon Dioxide and a Hydrogen-Carbon Dioxide Mixture," Int'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

U.S. Appl. No. 13/596,684, filed Aug. 28, 2012, Slobodyanskiy et al.

U.S. Appl. No. 14/066,579, filed Oct. 29, 2013, Huntington et al.

U.S. Appl. No. 14/066,551, filed Oct. 29, 2013, Minto.

U.S. Appl. No. 14/144,511, filed Dec. 30, 2013, Thatcher et al.

U.S. Appl. No. 14/067,559, filed Oct. 30, 2013, Lucas John Stoia et al.

U.S. Appl. No. 14/067,679, filed Oct. 30, 2013, Elizabeth Angelyn Fadde et al.

U.S. Appl. No. 14/067,714, filed Oct. 30, 2013, Carolyn Ashley Antoniono et al.

U.S. Appl. No. 14/067,726, filed Oct. 30, 2013, Carolyn Ashley Antoniono et al.

U.S. Appl. No. 14/067,731, filed Oct. 30, 2013, Carolyn Ashley Antoniono et al.

U.S. Appl. No. 14/067,739, filed Oct. 30, 2013, Carolyn Ashley Antoniono et al.

U.S. Appl. No. 14/067,797, filed Oct. 31, 2013, Anthony Wayne Krull et al.

U.S. Appl. No. 14/066,488, filed Oct. 29, 2013, Pramod K. Biyani et al.

U.S. Appl. No. 14/135,055, filed Dec. 19, 2013, Pramod K. Biyani et al.

U.S. Appl. No. 14/067,844, filed Oct. 30, 2013, John Farrior Woodall et al.

U.S. Appl. No. 14/067,486, filed Oct. 30, 2013, Huntington et al.

U.S. Appl. No. 14/067,537, filed Oct. 30, 2013, Huntington et al.

U.S. Appl. No. 14/067,552, filed Oct. 30, 2013, Huntington et al.

U.S. Appl. No. 14/067,563, filed Oct. 30, 2013, Huntington et al.

(56) References Cited

OTHER PUBLICATIONS

Carlson, L. O. (1988) "Performance of Hawkins Field Unit Under Gas Drive-Pressure Maintenance Operations and Development of an Enhanced Oil Recovery Project," *SPE/DOE 17324, Enhanced Oil Recovery Symposium*, Apr. 16-21, 1988, Tulsa, Oklahoma, pp. 49-58.

Clancy, J. P. et al. (1985) "Analysis of Nitrogen-Injection Projects to Develop Screening Guides and Offshore Design Criteria," *SPE Jrnl of Petroleum Technology*, v . 37, No. 6, Jun. 1985, pp. 1097-1104.

Fredericks, W. C. et al. (1984) "Enhanced Oil Recovery Using High Pressure Inert Gas Injection East Binger (Marchand) Unit," *AAPG Mid-Continent Reg. Mtg.—1981 Tech. Proc.*, pp. 198-213.

Kuehm, Harold G. (1977) "Hawkins Inert Gas Plant: Design and Early Operation," *SPE 6793, SPE Annual Fall Tech. Conf. and Exhibit.*, Oct. 9-12, 1977, Denver, Colorado, 11 pages.

US Department of Energy National Energy Technology Lab (2010) "Carbon Dioxide Enhanced Oil Recovery: Untapped Domestic Energy Supply and Long Term Carbon Storage Solution," Mar. 2010, 32 pages.

\* cited by examiner

PROCESSING EXHAUST FOR USE IN ENHANCED OIL RECOVERY

CROSS REFERENCE TO RELATED APPLICATIONS

This application claims the priority benefit of U.S. Patent Application 61/775,167 filed Mar. 8, 2013 entitled PROCESSING EXHAUST FOR USE IN ENHANCED OIL RECOVERY, the entirety of which is incorporated by reference herein.

FIELD

Exemplary embodiments of the present techniques relate to techniques for recovering exhaust heat from a combined cycle plant and using the recovered exhaust heat for enhanced oil recovery.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

A Brayton cycle engine commonly known as a gas turbine can be adapted to combust fuel at near stoichiometric conditions with exhaust gas recirculation. Such an engine is referred to as an ultra-low emission technology (ULET) because the emissions produced by the engine are primarily inert gases with low contaminant contents. Some ULET engines use the exhaust heat of the gas turbine to produce multiple pressure levels of superheated steam that is used in a condensing steam turbine to produce additional shaft power. In PCT Application Publication No. WO2012003079, such an arrangement is described and referred to as combined cycle power generation (CCPG). A power plant that implements CCPG is referred to as a combined cycle power plant or, simply, a combined cycle plant. Gas turbine combined cycle plants are rather efficient and can be operated at relatively low cost when compared to other technologies, such as coal and nuclear.

The steam turbine in a combined cycle plant runs most efficiently with high quality, i.e., dry, steam. Production of dry steam requires a water feed that is substantially free of contaminants, such as minerals, salts, and silica. Although water is produced as a byproduct of the combustion process in a ULET engine, this water is of low quality and is therefore not readily usable by a boiler of the steam turbine. The cost of purifying the water is often prohibitive and, therefore, the water is often simply discarded. Moreover, although the steam turbine in a combined cycle plant produces blowdown water, this water is also of low quality and is, therefore, discarded in many instances.

In addition, although using the exhaust heat of the gas turbine to produce additional shaft power instead of merely venting it improves overall efficiency of the combined cycle plant, there may be more economical uses for the exhaust heat. However, current combined cycle plants are not equipped to use the exhaust heat or the steam produced with the exhaust heat for any alternative purposes.

For example, U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust of the Brayton turbine. A portion of the exhaust gas is recirculated into the compressor inlet during part-load operation. However, no additional uses are disclosed for the exhaust heat or the steam produced with the exhaust heat.

SUMMARY

An embodiment described herein provides a method for generating steam for hydrocarbon production using a combined cycle power plant. The method includes producing steam using heat from an exhaust stream from a gas turbine system, condensing a water stream from combustion products in the exhaust stream, and using the water stream as a make-up water for production of the steam.

Another embodiment provides a method for using exhaust from a combined cycle plant in hydrocarbon production. The method includes producing steam using exhaust heat from an exhaust stream from a gas turbine system in the combined cycle plant and condensing a water stream from the exhaust stream. The water stream is used as a make-up stream for the steam production. A steam turbine is driven with at least a portion of the steam and at least another portion of the steam is injected into a hydrocarbon reservoir for a thermal recovery process.

Another embodiment provides a system for generating power and thermally recovering hydrocarbons from a reservoir. The system includes a gas turbine system configured to produce a hot exhaust stream as a byproduct of combustion. The system also includes a heat recovery steam generator (HRSG) configured to produce a steam stream using the hot exhaust stream, wherein the HRSG produces a condensate stream from the combustion products in the hot exhaust stream. A feed system is configured to use the condensate stream as at least part of a make-up water provided to the HRSG to generate the steam stream.

BRIEF DESCRIPTION OF THE DRAWINGS

The advantages of the present techniques are better understood by referring to the following detailed description and the attached drawings, in which.

DETAILED DESCRIPTION

Figure 1:
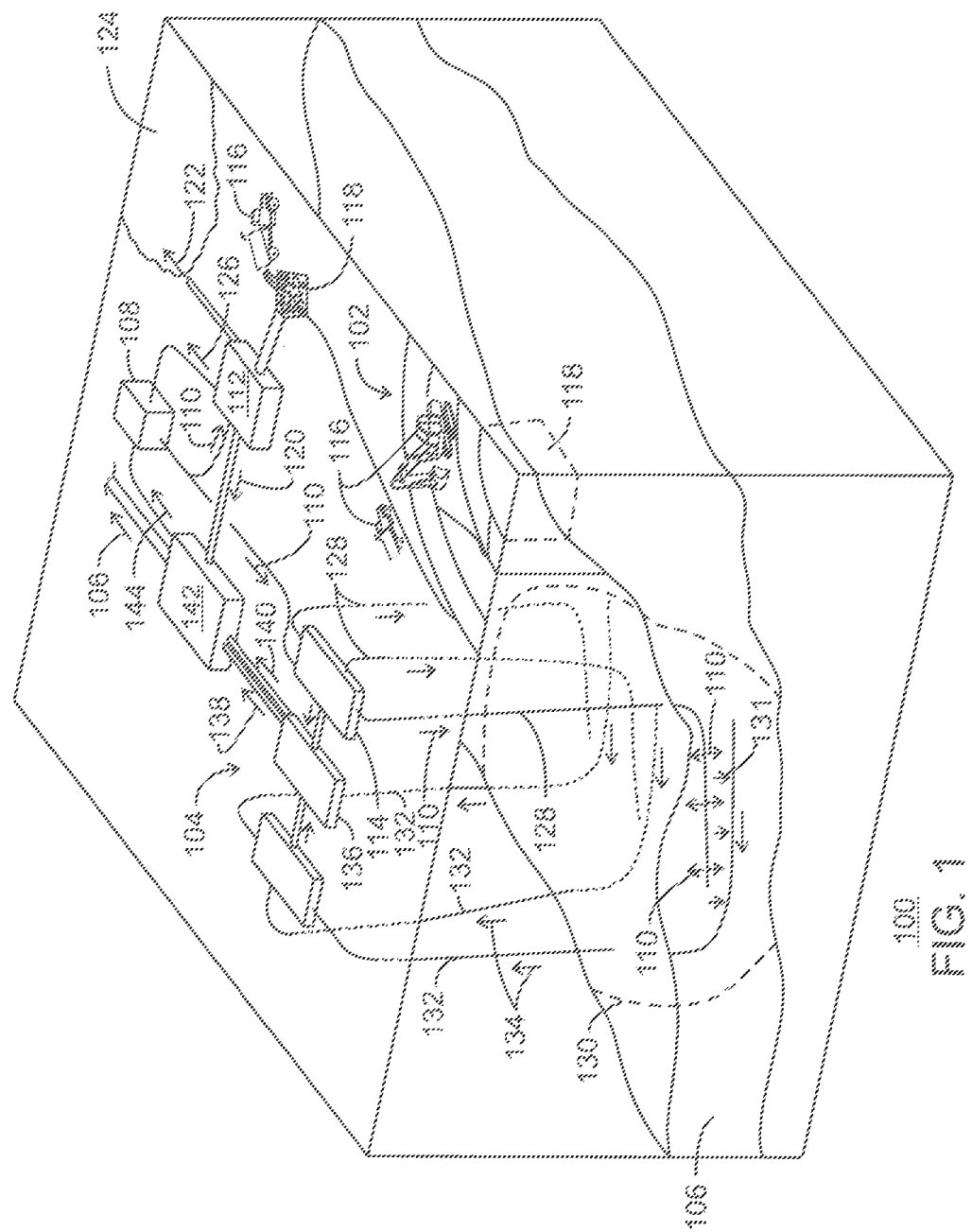
FIG. 1 is a schematic of a development illustrating the use of thermal recovery systems with a steam producing cogeneration facility.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. It is often the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of:

19 weight percent (wt. %) aliphatics, which can range from 5 wt. %-30 wt. %, or higher;
19 wt. % asphaltenes, which can range from 5 wt. %-30 wt. %, or higher;
30 wt. % aromatics, which can range from 15 wt. %-50 wt. %, or higher;
32 wt. % resins, which can range from 15 wt. %-50 wt. %, or higher; and
some amount of sulfur, which can range in excess of 7 wt. %.

In addition bitumen can contain some water and nitrogen compounds ranging from less than 0.4 wt. % to in excess of 0.7 wt. %. The metals content, while small, can be removed to avoid contamination of the product synthetic crude oil (SCO). Nickel can vary from less than 75 ppm (part per million) to more than 200 ppm. Vanadium can range from less than 200 ppm to more than 500 ppm. The percentage of the hydrocarbon types found in bitumen can vary.

The "Clark hot water extraction process" or "CHWE" was originally developed for releasing bitumen from oil sands, based on the work of Dr. K. A. Clark, and discussed in a paper by Corti et al., "Athabasca Mineable Oil Sands: The RTR/Gulf Extraction Process Theoretical Model of Bitumen Detachment," The 4th UNITAR/UNDP International Conference on Heavy Crude and Tar Sands Proceedings, vol. 5, Edmonton, AB, Aug. 7-12, 1988, pp. 41-44, 71. The process, which is also described in U.S. Pat. No. 4,946,597, uses vigorous mechanical agitation of oil sands with water and caustic alkali to disrupt the granules and form a slurry, after which the slurry is passed to a separation tank for the flotation of the bitumen, from which the bitumen is skimmed. The process may be operated at ambient temperatures, with a conditioning agent being added to the slurry. Earlier methods used temperatures of 85° C. and above together with vigorous mechanical agitation and are highly energy inefficient. Chemical adjuvants, particularly alkalis, have been utilized to assist these processes.

A "combined cycle power plant" or "CCPP" (also referred to herein as a "combined cycle plant") includes a gas turbine, a steam turbine, a generator, and a heat recovery steam generator (HRSG), and uses both steam and gas turbines to generate power. The gas turbine operates in an open or semi-closed Brayton cycle, and the steam turbine operates in a Rankine cycle. Combined cycle power plants utilize heat from the gas turbine exhaust to boil water in the HRSG to generate steam. The steam generated is utilized to power the steam turbine. After powering the steam turbine, the steam may be condensed and the resulting water returned to the HRSG. The gas turbine and the steam turbine can be utilized to separately power independent generators, or in the alternative, the steam turbine can be combined with the gas turbine to jointly drive a single generator via a common drive shaft. These combined cycle gas/steam power plants generally have higher energy conversion efficiency than Rankine-cycle or steam-only power plants. Currently, simple-cycle plant efficiency can exceed 44% while combined cycle plant efficiency can exceed 60%. The higher combined cycle efficiencies result from synergistic utilization of a combination of the gas turbine with the steam turbine.

A "compressor" is a machine that increases the pressure of a gas by the application of work (i.e., compression). Accordingly, a low pressure gas (e.g., at about 35 kPa) may be compressed into a high-pressure gas (e.g., at about 6,895 kPa) for transmission through a pipeline, injection into a well, or other processes.

As used herein, "condensate" includes liquid water formed by the condensation of steam. Steam may also entrain liquid water, in the form of water droplets. This entrained water may also be termed condensate, as it may arise from condensation of the steam, although the entrained water droplets may also originate from the incomplete conversion of liquid water to steam in a boiler.

"Cyclic Steam Stimulation" of "CSS" (also known as the "huff-and-puff" process) refers to a hot in-situ mining process in which a well is put through cycles of steam injection, heat soak, and pumped oil production. Specifically, CSS involves the cyclic introduction of high-temperature (e.g., about 300° C.-400° C.) steam into a reservoir through a horizontal well for prolonged periods of time (e.g., weeks to months). This may allow the steam to heat the mineralized formation and to fluidify the oils. The oils can then be recovered at the surface. The production and, therefore, the recovery of the oils may take place through another horizontal well situated at a higher depth.

A "dehydration device" is a device for removing water, in gaseous or liquid form, from a gas mixture. "Dewatered" describes broadly any reduction of water content. Typically, a dewatered hydrocarbon-containing material can have a majority of the water content substantially removed, e.g., less than about 5% by volume water or less than about 1% depending on the particular material and starting water content. Water contents much less than 1% may be desirable for certain gas streams.

A "development" is a project for the recovery of hydrocarbons using integrated surface facilities and long term planning. The development can be directed to a single hydrocarbon reservoir, although multiple proximate reservoirs may be included.

"Enriched" as applied to any stream withdrawn from a process means that the withdrawn stream contains a concentration of a particular component that is higher than the concentration of that component in the feed stream to the process.

As used herein, "exemplary" means "serving as an example, instance, or illustration." Any embodiment described herein as "exemplary" is not to be construed as preferred or advantageous over other embodiments.

A "facility" is a representation of a tangible piece of physical equipment through which hydrocarbon fluids are either produced from a reservoir or injected into a reservoir. In its broadest sense, the term facility is applied to any equipment that may be present along the flow path between a reservoir and its delivery outlets, which are the locations at which hydrocarbon fluids either enter the reservoir (injected fluids) or leave the reservoir (produced fluids). Facilities may include production wells, injection wells, well tubulars, wellhead equipment, gathering lines, manifolds, pumps, compressors, separators, surface flow lines, and delivery outlets. As used herein, a facility may also include a gas treatment unit, such as an acid gas separation unit, a cryogenic separation system, or a dehydration unit. In some instances, the term "surface facility" is used to distinguish those facilities other than wells. A "facility network" is the complete collection of facilities that are present in the system, which would include all wells and the surface facilities between the wellheads and the delivery outlets.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

A "heat recovery steam generator" or "HRSG" is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. As described herein, the HRSG may be used to provide steam to an enhanced oil recovery process, such as CSS or SAGD.

"Heavy oil" includes oils which are classified by the American Petroleum Institute (API) as heavy oils or extra heavy oils. In general, a heavy oil has an API gravity between 22.3° (density of 920 kg/m$^3$ or 0.920 g/cm$^3$) and 10.0° (density of 1,000 kg/m$^3$ or 1 g/cm$^3$). An extra heavy oil, in general, has an API gravity of less than 10.0° (density greater than 1,000 kg/m$^3$ or greater than 1 g/cm$^3$). For example, a source of heavy oil includes oil sand or bituminous sand, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker and therefore directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas, oil, and coal are hydrocarbons.

"Hydrocarbon production" or "production" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example, chemicals or hydraulic fracturing the well bore to promote increased flow, well servicing, well logging, and other well and wellbore treatments.

The term "natural gas" refers to a gas obtained from a crude oil well (associated gas), from a subterranean gas-bearing formation (non-associated gas), or from a coal bed. The composition and pressure of natural gas can vary significantly. A typical natural gas stream contains methane ($CH_4$) as a significant component. Raw natural gas may also contain ethane ($C_2H_6$), higher molecular weight hydrocarbons, acid gases (such as carbon dioxide, hydrogen sulfide, carbonyl sulfide, carbon disulfide, and mercaptans), and contaminants such as water, nitrogen, iron sulfide, wax, and crude oil.

"Pressure" is the force exerted per unit area by the gas on the walls of the volume. Pressure can be shown as kilopascals (kPa).

As used herein, a "Rankine cycle power plant" includes a vapor generator, a turbine, a condenser, and a recirculation pump. For example when the vapor is steam, a "Rankine cycle power plant" includes a steam generator, a steam turbine, a steam condenser, and a boiler feed water pump. The steam is used to generate electricity by driving a generator from the steam turbine. The reduced pressure steam is then condensed in the steam condenser. The resulting water is recirculated to the steam generator to complete the loop.

"Reservoir formations" or "reservoirs" are typically pay zones including sandstone, limestone, chalk, coal, and some types of shale. Pay zones can vary in thickness from less than one foot (0.3048 meters) to hundreds of feet (hundreds of meters). The permeability of the reservoir formation provides the potential for production.

"Sequestration" refers to the storing of a gas or fluid that is a by-product of a process rather than discharging the fluid to the atmosphere or open environment. For example, as described herein, carbon dioxide gas formed from the burning or steam reforming of hydrocarbons may be sequestered in underground formations, such as coal beds.

"Steam Assisted Gravity Drainage" or "SAGD" is a thermal recovery process in which steam is injected into a first well to lower a viscosity of a heavy oil, and fluids are recovered from a second well. Both wells are usually horizontal in the formation, and the first well lies above the second well. Accordingly, the reduced viscosity heavy oil flows down to the second well under the force of gravity, although pressure differential may provide some driving force in various applications.

The term "steam-flooding" is synonymous with the term "steam injection." Both terms describe a technique by which steam is injected into an underground formation to cause increased flow of viscous hydrocarbons.

As used herein, a "steam generator" may include any number of devices used to generate steam for a process facility, either directly or as part of another process. Steam generators may include, for example, heat recovery steam generators (HRSG), and once through steam generators (OTSG), among others. The steam may be generated at a number of quality levels. Steam quality is measured by the mass fraction of a cold water stream that is converted into a vapor. For example, an 80% quality steam has around 80 wt. % of the feed water converted to vapor. The steam is generated as wet steam that contains both steam vapor and associated condensate (or water). The wet steam may be passed through a separator to generate a dry steam, i.e., without entrained condensate. As a result of the separation, the separator also generates a liquid condensate stream.

As used herein, a "steam system" includes one or more steam generators running in parallel from a common feed water source and feeding steam to a common outlet. The steam system may include any number or types of steam generators in parallel. Often, the parallel steam generators of the steam system generate steam at a similar quality level.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, "thermal recovery processes" include any type of hydrocarbon recovery process that uses a heat source to enhance the recovery, for example, by lowering the viscosity of a hydrocarbon. These processes may be based on heated water, wet steam, or dry steam, alone, or in any combinations. Further, any of these components may be combined with solvents to enhance the recovery. Such processes may include subsurface processes, such as cyclic steam stimulation (CSS), steam flooding, and SAGD, among others, and processes that use surface processing for the recovery, such as sub-surface mining and surface mining.

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes. Wells may be cased, cased and cemented, or open-hole well, and may be any type, including, but not limited to a producing well, an injection well, an experimental well, and an exploratory well, or the like. A well may be vertical, horizontal, or any angle between vertical and horizontal (a deviated well), for example a vertical well may include a non-vertical component.

Overview

Embodiments described herein extend combined cycle plant technologies to produce steam for purposes other than generating additional shaft power on a shaft of a gas turbine system in a combined cycle plant. For example, in various embodiments, a HRSG of the combined cycle plant produces wet steam, i.e., steam with a quality equal to or less than 1, for use in a hydrocarbon thermal recovery process, such as a CSS process or a SAGD process. The hydrocarbons recovered by such processes are typically viscous hydrocarbons, including heavy oil, tar, or bitumen. The HRSG may also produce dry steam for generation of additional shaft power depending on the wet steam and power demands in the different phases of a hydrocarbon recovery process. For example, the HRSG may be designed to convert 50% of the available exhaust heat to dry steam to provide added power production for a nearby heavy oil upgrading, pumping or compression facilities and convert the remaining exhaust heat to produce wet steam for a thermal recovery process. Furthermore, the HRSG design may be flexible to control the steam flow from the dry steam system, for example by controlling the pressure of the steam drum and/or steam coils, to affect the heat transfer balance between the dry and wet steam systems. For example, by raising the dry steam pressure in the drum and steam coils, less dry steam is boiled off due to the higher boiling temperature thus leaving more exhaust heat in the HRSG to produce additional wet steam.

The HRSG cools the exhaust stream from the gas turbine engine in the combined cycle power plant, which causes water formed in the combustion to condense out. Further cooling of the stream, for example in an exhaust gas recirculation system, can remove more water from the exhaust gas. The condensed water, or condensate, can be purified and used as a source of water for the steam production. As many hydrocarbon production processes are located in areas with limited water resources, this can provide an additional source of water for the processes.

A number of techniques have been developed for producing heavy oil from subsurface formations using thermal recovery operations. Thermal recovery operations are used around the world to recover liquid hydrocarbons from both sandstone and carbonate reservoirs. These operations include the conventional suite of steam based in-situ thermal recovery techniques, such as CSS, steam-flooding, and SAGD, as well as surface mining and their associated thermal based surface extraction techniques.

SAGD techniques are based on a continuous injection of steam through a first well to lower the viscosity of heavy oils and a continuous production of the heavy oil from a lower-lying second well. In SAGD, two horizontal wells are completed into the reservoir. The two wells are first drilled vertically to different depths within the reservoir. Thereafter, using directional drilling technology, the two wells are extended in the horizontal direction that result in two horizontal wells, vertically spaced from, but otherwise vertically aligned with each other. Ideally, the production well is located above the base of the reservoir but as close as practical to the bottom of the reservoir, and the injection well is located vertically 10 to 30 feet (3 to 10 meters) above the horizontal well used for production.

The upper horizontal well is utilized as an injection well and is supplied with steam from the surface. The steam rises from the injection well, permeating the reservoir to form a vapor chamber that grows over time towards the top of the reservoir, thereby increasing the temperature within the reservoir. The steam, and its condensate, raise the temperature of the reservoir and consequently reduce the viscosity of the heavy oil in the reservoir. The heavy oil and condensed steam will then drain downward through the reservoir under the action of gravity and may flow into the lower production well, whereby these liquids can be pumped to the surface. At the surface of the well, the condensed steam and heavy oil are separated, and the heavy oil may be diluted with appropriate light hydrocarbons for transport by pipeline.

As a result of the unique wellbore configuration in SAGD, any condensate injected into the reservoir with the steam will fall directly to the underlying production well due to the influence of gravity, and thereby not contribute to the recovery of the hydrocarbons. For this reason, in SAGD projects such as those operating in the Athabasca region of Alberta, the current convention is to separate the condensate and only inject the steam phase into the injection wells used in the recovery process. The steam phase after the condensate has been removed is commonly referred to as dry steam.

In various embodiments, the HRSG of the combined cycle plant includes two steam generation systems, each being fed a different quality of water and producing a correspondingly different quality of steam. For example, a first stream of steam of low quality can be produced for use in hydrocarbon recovery process, while a second stream of high quality steam can be produced for use in generating additional shaft power in a gas turbine system. The first and second streams of steam can be produced simultaneously or, in some instances, only one stream can be produced. The amount of steam produced in each stream can depend on demand levels for hydrocarbon recovery and/or power generation. In addition, the condensed water produced as a byproduct of combustion in the combined cycle plant and/or the blowdown water produced by the steam turbine of the combined cycle plant can be used as feed water for producing low quality steam rather than simply being discarded.

Using Exhaust Heat from Combined Cycle Plant for Enhanced Oil Recovery

FIG. 1 is a schematic of a development 100 illustrating the use of thermal recovery systems with a steam producing cogeneration facility. The thermal recovery systems that are illustrated include both a surface mining 102 and extraction recovery process, and a subsurface thermal recovery process 104, such as cyclic steam stimulation (CSS) or steam assisted gravity drainage (SAGD). The subsurface thermal recovery process 104 allows for recovery of hydrocarbons from a reservoir 106 that is too deep for surface mining. It will be clear that the techniques described herein are not limited to this combination, or these specific techniques, as any number of techniques or combinations of techniques may be used in embodiments described herein. For example, the SAGD 104 recovery process can instead be a cyclic steam stimulation (CSS) recovery process or other thermal recovery process.

The surface mining 102 may be used to reach a portion of the reservoir 106 that is closer to the surface, while the underground 104 recovery may be used to access hydrocarbons in a portion of the reservoir 106 that is at a greater depth. If, however, the reservoir does not have any portion that is easily accessible by surface mining, the surface mining 102 recovery process may be omitted.

In the development 100, a cogeneration facility 108 is used to generate power and steam 110, which can be provided to a surface separation facility 112 and an injection facility 114. The steam 110 may include wet steam only or both wet steam and dry stream, for example, carried in different pipes from the steam generation facility 108.

The surface mining 102 uses heavy equipment 116 to remove hydrocarbon containing materials 118, such as oil sands, from the reservoir 106. The hydrocarbon containing materials are offloaded at the separation facility 112, where a thermal process, such as a Clark hot water extraction (CHWE) process, among others, may be used to separate a hydrocarbon stream 120 from a tailings stream 122. The tailings stream 122 may be sent to a tailings pond 124, or may be injected into a sub-surface formation for disposal. A water stream 126 may be recycled to the steam generation facility 108. The extraction process may utilize wet steam from the cogeneration facility 108.

The subsurface thermal recovery process 104 injects the steam 110 into the reservoir through injection wells 128 to produce hydrocarbons. The injection raises the temperature of a portion 130 of the reservoir 106 to lower the viscosity of the hydrocarbons 131, allowing the hydrocarbons 131 to flow to collection wells 132. Although, for the sake of clarity, the injection wells 128 and collection wells 132 are shown as originating from different locations in FIG. 1, these wells 128 and 132 may be drilled from the same surface pads to enable easier tracking between the wells 128 and 132. Moreover, if the subsurface thermal recovery process 104 is CSS, a single well may be used for both steam injection and collection of hydrocarbons and steam condensate. The resulting streams 134 from the reservoir 106 may include the hydrocarbons 131 and the condensate from the steam 110. The streams 134 can be processed at a surface facility 136 to remove at least some of the water. A CSS process may use lower quality steam, e.g., greater than about 70%, while a SAGD process may utilize higher quality steam, e.g., greater than about 90%, or dry steam from a steam generator at the cogeneration facility 108.

The hydrocarbon stream 138 and water stream 140 from the subsurface thermal recovery process 104 may be sent to a transportation facility 142, which may provide further separation and purification of the incoming streams 120, 138, and 140, prior to sending the marketable hydrocarbons 106 on to further processing facilities. The resulting process water 144 can be returned to a steam generator at the cogeneration facility 108 for recycling.

The schematic of FIG. 1 is not intended to indicate that the development 100 is to include all the components shown in FIG. 1. Further, the development 100 may include any number of additional components not shown in FIG. 1, depending on the details of the specific implementation.

Figure 2:
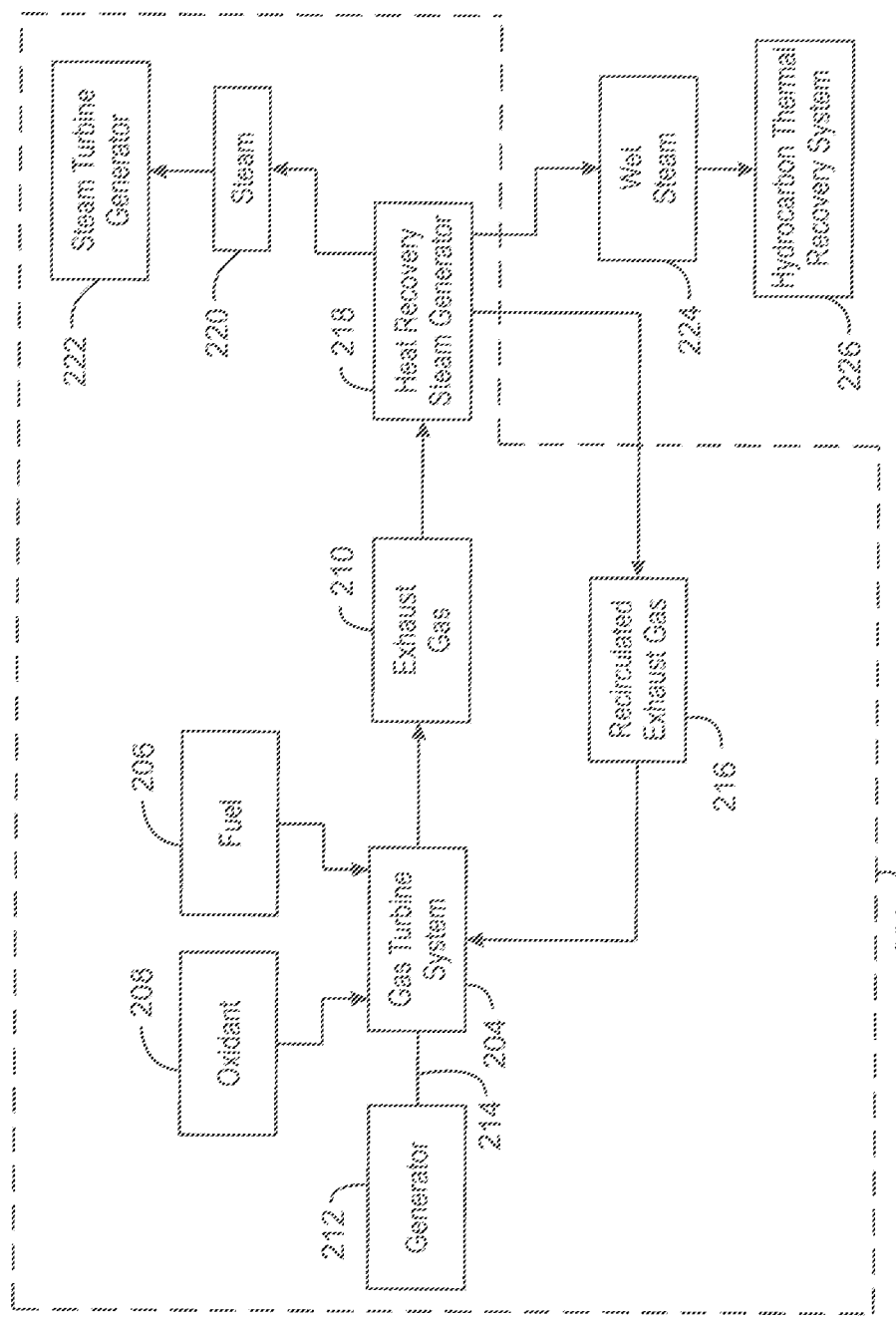
FIG. 2 is a simplified block diagram of another development illustrating a detailed view of a cogeneration facility of the development.

FIG. 2 is a simplified block diagram of another development 200 illustrating a detailed view of a cogeneration facility 202 of the development 200. The cogeneration facility 202 may correspond to the cogeneration facility 108 of FIG. 1. The cogeneration facility 202 includes a gas turbine system 204, which may be characterized as a power-producing semi-closed Brayton cycle. In various embodiments, the gas turbine system 204 includes a combustion chamber (not shown) for combusting a fuel 206 mixed with a compressed oxidant 208. The fuel 206 may include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof. The oxidant 208 may include any suitable gas containing oxygen, such as air, oxygen-rich air, oxygen-depleted air, pure oxygen, or any combinations thereof In addition to a combustion chamber, the gas turbine system 204 includes a main compressor and an expander (not shown). The combustion chamber of the gas turbine system 204 produces an exhaust gas 210, which can be sent to any variety of apparatuses and/or facilities in an exhaust gas recirculation (EGR) system back to the gas turbine system 204. As the exhaust gas 210 expands through the expander of the gas turbine system 204, it generates mechanical power to drive the main compressor of the gas turbine system 204 and an electrical generator 212, for example, through a shaft 214. Other systems may also be driven by the mechanical power, such as pumps, compressors, and/or other facilities.

In some implementations (not shown in FIG. 2), the EGR system may include a compressor. As opposed to a conventional fan or blower system, the compressor can compress and increase the overall density of the exhaust gas, thereby directing a pressurized or compressed recycle exhaust gas 216 into the main compressor of the gas turbine system 204. The compressed recycle exhaust gas 216 can be used to help facilitate a stoichiometric or substantially stoichiometric combustion of the oxidant 208 and fuel 206 by moderating the temperature of the combustion products.

The EGR system of the cogeneration facility 202 includes a heat recovery steam generator (HRSG) 218, or similar device. The HRSG 218 delivers a first stream of steam 220 to a steam turbine 222. In various embodiments, the combination of the HRSG 218 and the steam turbine 222 are part of a power-producing closed Rankine cycle. The gaseous exhaust stream 210 is introduced to the HRSG 218 and is used to generate the first stream of steam 220 and a recycled exhaust gas 216. The HRSG 218 may optionally include a catalytic system to reduce residual oxygen, carbon monoxide, hydrogen, unburned hydrocarbons, or other products of incomplete combustion in the exhaust gas 210.

In some embodiments, the first stream of steam 220 is sent to the steam turbine 222, as shown, to generate additional mechanical power. The additional mechanical power can be used to power a separate generator. Alternatively, the steam turbine 222 can be coupled, for example, through a gear box, to the shaft 214 of the gas turbine system 204 to supplement the mechanical energy generated by the gas turbine system 204. In some embodiments, the first stream of steam 220 is dry steam (i.e., high quality steam), which, relative to wet steam, reduces the likelihood of scaling and associated damage on the inside of the steam turbine 222.

The HRSG 218 also delivers a second stream of steam 224 to a thermal recovery system 226 to facilitate recovery of viscous hydrocarbons from a reservoir or from material removed from a reservoir. The thermal recovery system 226 may implement a SAGD process, a steam-flooding process, a CSS process, a CHWE process, or the like. In some embodiments, the second stream of steam 224 is wet steam (i.e., low quality steam), as shown. However, as will be explained in more detail below with reference to FIG. 4, the second stream of steam may instead be dry stream. The cogeneration facility 202 is not limited to delivering the second stream of steam 224 to a thermal recovery system 226. In addition or alternatively, the cogeneration facility 202 may deliver the second stream of steam 224, or a third stream of steam, to a system that uses the stream of steam in a utility heating process, a process heating process, and/or a steam stripping process.

The block diagram of FIG. 2 is not intended to indicate that the development 200 is to include all the components shown in FIG. 2. Further, the development 200 may include any number of additional components not shown in FIG. 2, depending on the details of the specific implementation. For example, the development 200 may include any number of additional valves, gear boxes, sensors, control systems, condensers, or the like.

Figure 3:
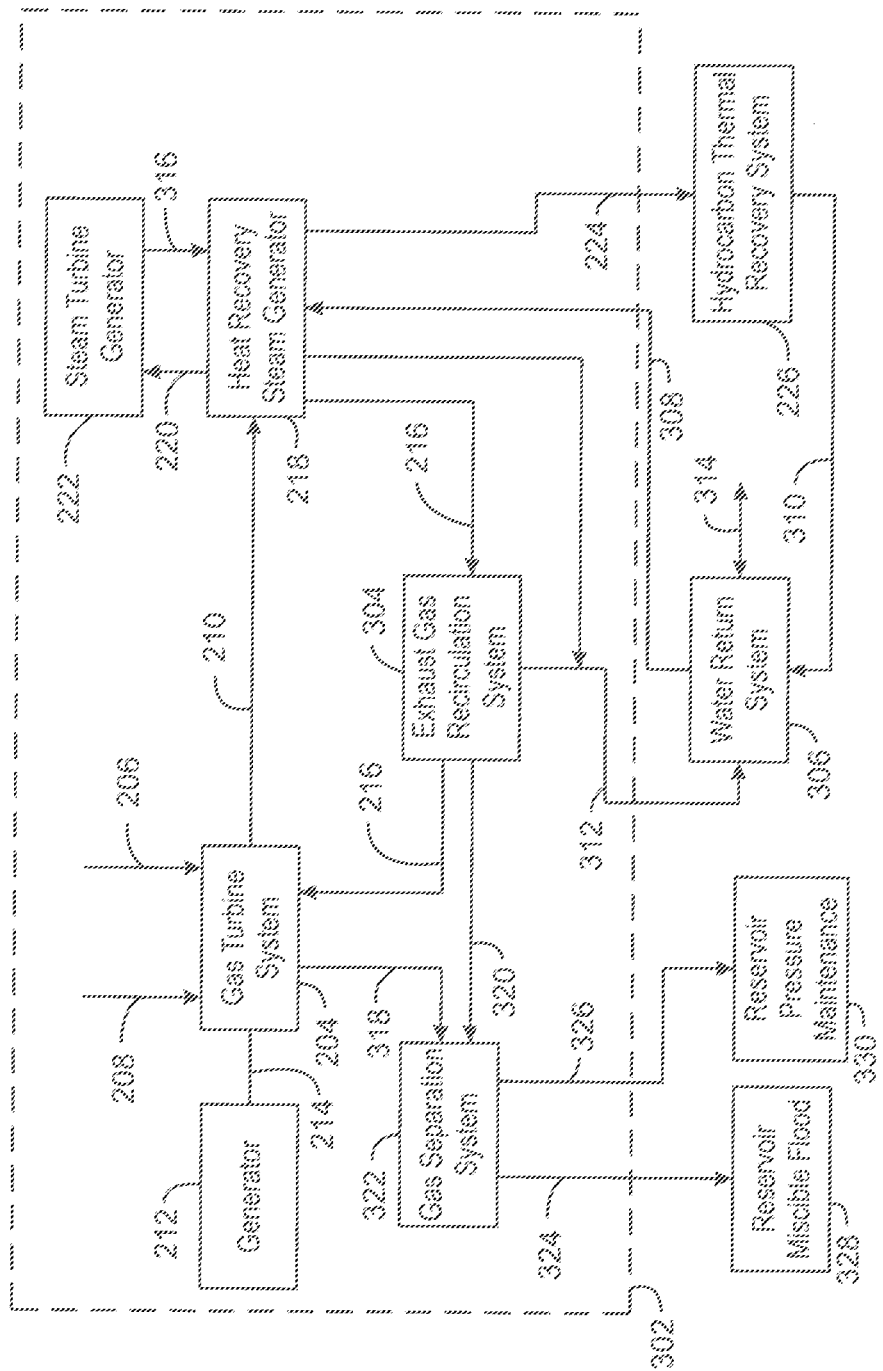
FIG. 3 is a simplified block diagram of another development illustrating a detailed view of a cogeneration facility of the development.

FIG. 3 is a simplified block diagram of another development 300 illustrating a detailed view of a cogeneration facility 302 of the development 300. Certain elements in FIG. 3 have the same function as corresponding elements in FIG. 2 and, accordingly, are referenced with the same reference number as in FIG. 2. For example, the cogeneration facility 302 of the development 300 includes the gas turbine system 204. The gas turbine system 204 can include a combustion chamber for combusting the fuel 206 mixed with the compressed oxidant 208. The combustion chamber of the gas turbine system 204 produces exhaust gas 210, which can be sent to any variety of apparatuses and/or facilities in an exhaust gas recirculation (EGR) system 304 back to the gas turbine system 204. As the exhaust gas 210 expands through an expander of the gas turbine system 204, it generates mechanical power to drive the main compressor of the gas turbine system 204 and the electrical generator 212 through the shaft 214.

The EGR system 304 is fluidly coupled to the HRSG 218 to transport and process the partially cooled gas turbine exhaust gas 216 back to the gas turbine system 204. The EGR system 304 may include various components (not shown), an exhaust gas cooler such as a direct contact cooler or shell and tube heat exchanger or air-fin heat exchanger to reduce the temperature of the exhaust gas to about 4-66 degrees Celsius (° C.), a water spray to remove dust or debris from the exhaust gas, and/or an inertial separator to remove water droplets and mist from the cooled recycle exhaust gas in line 216. The EGR system 304 may also include a blower, fan, or compressor to increase the pressure of the recycle exhaust gas by about 1-21 kPa. The blower, fan, or compressor can compress and increase the overall density of the recycle exhaust gas, thereby directing a pressurized or compressed recycle exhaust gas in line 216 into the main compressor of the gas turbine system 204. The pressurized recycle exhaust gas can be used to help facilitate a stoichiometric or substantially stoichiometric combustion of the oxidant 208 and fuel 206 by moderating the temperature of the combustion products.

The HRSG 218 of the cogeneration facility 302 generates and delivers the first stream of steam 220 to the steam turbine 222 to generate additional mechanical power. The additional mechanical power can be used to power a separate electrical generator. Alternatively, the steam turbine 222 can be coupled, for example, through a gear box, to the shaft 214 of the gas turbine system 204 to supplement the mechanical energy generated by the gas turbine system 204. Other systems may be driven by the mechanical power, such as pumps, compressors, and/or other facilities.

The HRSG 222 also generates and delivers the second stream of steam on line 224 to a thermal recovery system 226 to facilitate recovery of viscous hydrocarbons from a reservoir. The thermal recovery system 226 may implement a SAGD process, a steam-flooding process, a CSS process, a CHWE process, or the like.

In some embodiments, the first stream of steam 220 is high quality steam, and the second stream of steam 224 is low quality steam. In addition or alternatively, the cogeneration facility 302 may deliver the second stream of steam 224, or a third stream of steam, to a system that uses the stream of steam in a utility heating process, a process heating process, and/or a steam stripping process.

A water return system 306 provides at least a portion 308 of the feed water used in the HRSG 218. The water return system 306 receives water 310 produced from the thermal recovery system 226. The water 310 produced by the thermal recovery system 226 may first be separated from other well fluids before being sent to the water return system 306. The water return system 306 may process received water by filtration, stripping, pH control and/or other means so that it is suitable for use as feed water to the HRSG 218.

Another source of water to the water return system 306 is water produced by the combustion of fuel and oxidant within the gas turbine system 204. At least some water in the recycle exhaust gas 216 is condensed as the recycle exhaust gas is cooled. This condensed water 312 may be transported to the water return system 306 for processing and used to make-up an imbalance between the flow rates of the steam 224 and the produced water 310. In some cases, the condensed water 312 may exceed the amount used for make-up, and some water may be exported or stored as indicated by an arrow 314. In other cases, the condensed water 312 may be inadequate and additional water from storage or external supplies may be received to make-up the stream of steam to the thermal recovery system 226 as indicated by the arrow 314.

The water return system 306 may also include a water purification system for preparing the portion 308 of water used as the make-up water to the HRSG 218. The water purification system can use any number of systems known in the art to filter the water, adjust the pH of the water, removed dissolved gases, remove dissolved oxygen, or remove dissolved solids. Such techniques can include, for example, hot lime softening which may lower the concentration of contaminates by forcing their precipitation. Any number of other techniques may also be used alone or in various combinations, including filtration, steam stripping, evaporative purification (distillation), membrane purification, chemical purification, ion exchange, and the like. For example, the condensed water 312 from the exhaust gas recirculation system 304 and HRSG 218 will generally be at a low pH, e.g., about 4 pH units, as a result of dissolved $CO_2$ in the exhaust. The low pH may cause damage to the HRSG 218 as the steam is formed. To decrease this problem, a steam stripper may be used to remove the dissolved $CO_2$ and shift the pH to a higher level. Steam stripping may also be used, alone, or in combinations with oxygen scavengers, to remove oxygen from the portion 308 of the feed water used in the HRSG 218 to lower the amount of oxygen injected by the thermal recovery process 226. Further, chemicals, such as sodium sulfate, sodium carbonate, or others, can be added to increase the pH to between about 7 to about 9 pH units.

Water 310 produced from the thermal recovery process 226 may have suspended or dissolved solids, or both, from the formation. Suspended solids may be removed by passing the water 310 through a filtration system, for example, including fiber or ceramic filter cartridges, among others. Dissolved solids can be removed by reverse osmosis, among other known techniques. In an embodiment, the dissolved solids are not removed, but allowed to pass through a low quality steam generator. Generation of low quality steam, e.g., 70% to 90% steam, is less likely to cause fouling of a steam generator from dissolved solids.

Generally, since the wet CSS steam is not superheated and generally has a steam quality in the range of 70 to 100%, the requirements for the CSS feed water quality are not as stringent as those for the feed water that is returned to or used as make-up to the steam turbine generation system.

The HRSG 218 may include two steam generation systems, a first one for the stream of steam 220 for the steam turbine 222, and a second one for the stream of steam 224 for the thermal recovery system 226. The first steam generation system can use high quality boiler feed water to produce high pressure, highly superheated steam for the steam turbine 222 while, in some embodiments, the thermal recovery system 226 provides wet steam and, therefore, requires lower quality boiler feed water that is consistent with re-use of water produced from the hydrocarbon reservoir with less extensive water treatment than would be required for the steam turbine 222. Accordingly, the water return system 306 may process and produce water of a first quality as feed water for the first steam generation system of the HRSG 218 and water of a second quality as feed water for the second steam generation system of the HRSG 218.

In addition, the steam turbine 222 generally requires less steam blow down and therefore less water makeup, while certain thermal recovery systems, such as a CSS system, effectively have a large continuous blow down (i.e., wet steam is generally produced) and require more water make-up to replace water that is not recovered from the hydrocarbon reservoir. Therefore, the HRSG 218 may receive the steam blowdown 316 from the steam turbine 222 and use the steam blowdown 316 as make-up feed water for the thermal recovery system 226. Using the steam blowdown 316 as make-up feed water is a better alternative to the conventional practice of disposal, which is wasteful and which can have harmful effects on the environment.

The gas turbine system 204 may be adapted to extract a purge stream 318 from the recycle exhaust gas 216. Moreover, the EGR system 304 may be adapted to extract a part of the recycle exhaust gas 222 as a product gas or alternate purge stream 320 prior to delivery of the recycle exhaust gas 216 back to the gas turbine system 204. The purge stream 318 from the gas turbine system 204 and/or the alternate purge stream 320 from the EGR system 304 are fluidly coupled to a gas separation system 322. The gas separation system 322 may optionally include a catalytic system similar in purpose to the system described in the HRSG 218 to further remove products of incomplete combustion remaining in the purge stream 318 and/or alternate purge stream 320.

The gas separation system 322 may receive the purge stream 318 and/or alternate purge stream 320 and may employ any suitable gas separation technology to separate $CO_2$ from an inert gas in the extraction stream 318 and 320. Suitable gas separation technologies include, but are not limited to, solvent extraction using amines, hot potassium carbonate, or other solvents, molecular sieve separation, and solid sorbent separation. The products of the gas separation system 322 are a $CO_2$ rich stream 324 and a $CO_2$ lean stream 326. In some embodiments, the $CO_2$ lean stream 326 mainly consists of inert gases, such as nitrogen. These separated streams may be used separately, in conjunction with each other, or in conjunction with other production well fluids (e.g., natural gas), to enhance a hydrocarbon thermal recovery process carried out in the reservoir 106 or another proximate hydrocarbon reservoir. Proximate reservoirs may be those local to the viscous hydrocarbon reservoir 106 or those within an economic transport distance by pipeline or other transport methods.

For example, the $CO_2$ rich stream 324 may be fed to a reservoir miscible flood process 328 for combined injection with steam, e.g., the stream of steam in line 224, into a reservoir. Injection of $CO_2$ with steam stimulation may increase recovery of viscous hydrocarbons relative to steam stimulation alone. Alternatively, the $CO_2$ rich stream 324 can be used for sales, used in another processes requiring $CO_2$, and/or further compressed and injected into a terrestrial reservoir for sequestration or another purpose. The $CO_2$ lean stream 326 may be fed to a reservoir pressure maintenance system 330 for maintenance of pressure levels in the reservoir 106 or another proximate hydrocarbon reservoir.

The gas separation system 322 may separate anywhere from zero to 100% of the $CO_2$ from the purge extraction or alternate purge extraction streams. The separation percentage may be established by the separation technology employed or by the quantity of $CO_2$ or inert gas required in a specific application. In some applications, only inert gases may be required, and no $CO_2$ separation technology may be employed within the gas separation system 322. Further, the gas separation system 322 may operate at a low pressure similar to that of the alternate purge stream 320 and may include compressors to increase the pressure of the $CO_2$ rich stream 324 and/or the $CO_2$ lean stream 326. Alternatively, the gas separation system 322 may operate at a high pressure similar to that of the purge stream 318 to reduce the size of the $CO_2$ separation equipment and include additional compression as required for the product streams. The gas separation system 322 may also operate at higher pressures than either purge stream 318 or 320 by compressing the purge stream 318 or 320 to reduce the size of the $CO_2$ separation equipment and reduce or eliminate the need for additional compression of the product streams 324 and 326. Some $CO_2$ separation processes, such as hot potassium carbonate (Hot Pot), are only economical at higher pressures and, therefore, low pressure extraction without compression would not be feasible for these processes. In addition, either purge stream 318 or 320 may be injected into a subterranean reservoir, after any required compression and treating, for enhanced hydrocarbon recovery, pressure maintenance, carbon sequestration or similar methods without separation into $CO_2$ rich and $CO_2$ lean streams by a gas separation system 322. Stream 318, 320, 324 or 326 may require further processing prior to injection into a reservoir, such as dehydration or removal of contaminants by filtration, catalytic conversion or similar processes.

In some embodiments, the cogeneration facility 302 includes a control system or systems (not shown) adapted to control the flow rate at which fuel 206 and oxidant 208 are fed to the combustion chamber of the gas turbine system 204 to cause a near stoichiometric ratio of fuel and oxidant such that the equivalence ratio of the combustion is maintained in the range of 0.8 to 1.2, 0.9 to 1.1, 0.95 to 1.05, or preferably 0.99 to 1.02, while also achieving desired shaft power, temperature, pressure, flow or similar objectives. The control system or systems may also control the flow rate of the purge streams 318 and/or 320 to maintain a flow or pressure or similar balance within the gas turbine system 204, the heat recovery steam generator 218, and the EGR system 304.

The block diagram of FIG. 3 is not intended to indicate that the development 300 is to include all the components shown in FIG. 3. Further, the development 300 may include any number of additional components not shown in FIG. 3, depending on the details of the specific implementation. For example, the development 300 may include any number of additional valves, gear boxes, sensors, control systems, condensers, or the like.

Figure 4:
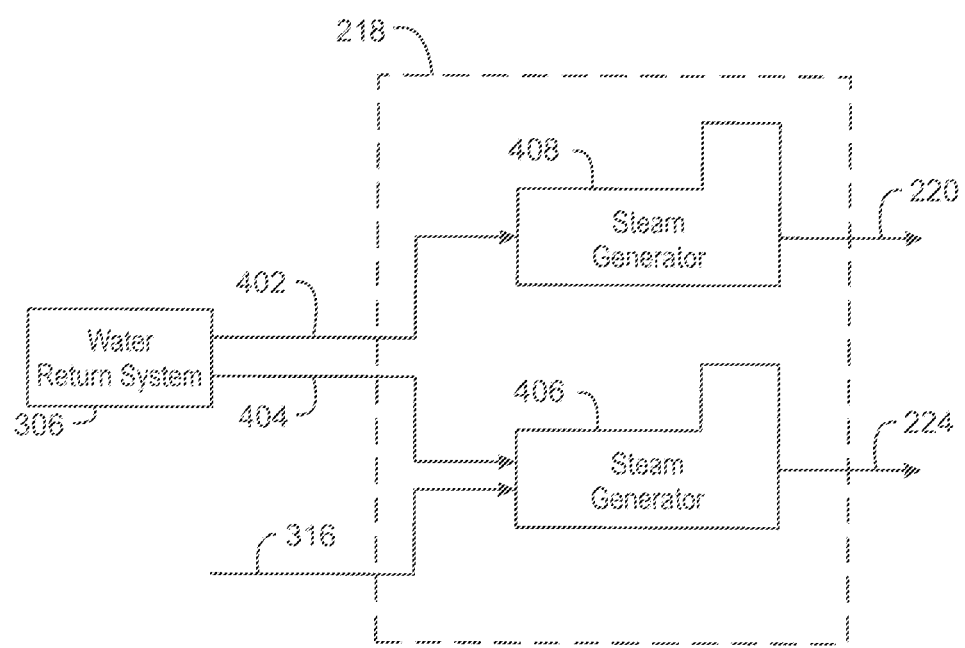
FIG. 4 is a simplified block diagram of a portion of the development of FIG. 3 illustrating a detailed view of the HRSG of the development according to a first embodiment.

FIG. 4 is a simplified block diagram of a portion 400 of the development 300 illustrating an exemplary HRSG 218. Like numbered items are as described with respect to previous figures. In the portion 400 shown, the HRSG 218 produces a stream of high quality steam in line 220, for use by the steam turbine 222, and a stream of low quality steam in line 224, for use by the thermal recovery system 226. Correspondingly, the water return system 306 processes water to produce two streams of feed water. The first feed water stream 402 is of a low quality relative to the second feed water stream 404. Two steam generators 406 and 408 in the HRSG 218 receive the respective feed water streams and generate the two streams of steam in lines 224 and 220, respectively. The steam generator 406 also receives the steam blowdown 316 from the steam turbine 228 as another source of feed water.

A controller (not shown) controls an amount of steam generated by each steam generator 406 and 408. For example, if a power demand is greater than a demand for hydrocarbon recovery, the controller opens and closes appropriate valves to direct a majority of the heat from the exhaust gas in line 216 to the steam generator 408, which generates steam for the steam turbine 222. Conversely, if the exhaust heat is of greater economical use in recovering hydrocarbons, a majority of the heat is directed to the steam generator 406, which generates steam for the thermal recovery system 226. Alternately, similar outcomes may be achieved by controlling the steam drum pressure for steam stream 220 (preferred) or the steam drum pressure for steam stream 224 in a single HRSG without the need to control the exhaust flow among the HRSGs. By increasing the pressure in a steam drum, the temperature at which the steam boils is increased and less heat is transferred in the associated steam coils and less steam is produced in that coil. Consequently, more heat remains in the exhaust flow to produce more steam in the other steam coil. Thus by controlling the steam flow from the steam drums and affecting the pressure in each stream drum, the amount of steam produced in the dry vs. the wet steam systems may be controlled.

Figure 5:
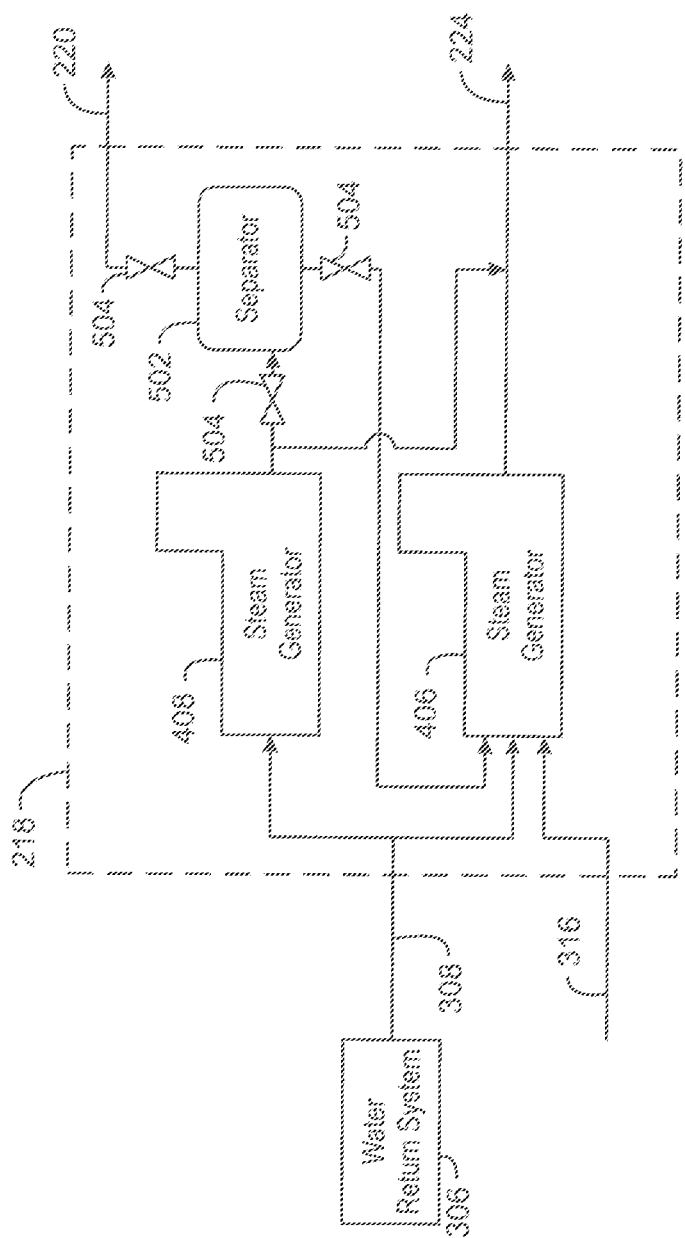
FIG. 5 is a simplified block diagram of a portion of the development of FIG. 3 illustrating a detailed view of the HRSG of the development according to a second embodiment.

FIG. 5 is a simplified block diagram of a portion 500 of the development 300 illustrating another exemplary configuration of the HRSG 218. Like numbered items are as described with respect to previous figures. As in the portion 400 shown in FIG. 4, in the portion 500 shown in FIG. 5, the HRSG 218 produces a stream of high quality steam 220, for use by the steam turbine 222, and a stream of low quality steam 224, for use by the thermal recovery system 226. However, in this example, the water return system 306 processes water to produce a single stream of high quality feed water 308. The two steam generators 406 and 408 in the HRSG 218 receive the feed water stream 308 and generate the two streams of steam 224 and 220, respectively. To improve the quality of the stream of steam in line 220, a separator 502 in the HRSG 218 receives steam from the high quality steam generator 408 and separates a vapor phase or dry steam from a liquid phase or condensate. The dry steam leaves the separator 502 via line 220 for use by the steam turbine 222.

At least a portion of the condensate from the separator 502 can be recycled to an inlet of the low quality steam generator 406. Typically, less than 100% of the condensate will be recycled, as any dissolved salts in the condensate will be concentrated over time and can foul the boiler tubes in the steam generator 406. Therefore, when recycling the condensate, at least a portion is continuously purged to a disposal (not shown) and replaced by clean boiler feed water from the water return system 306.

A controller (not shown) can control various elements of the HRSG 224 including a set of valves 504. The valves 504 can be used to control the flow of steam and condensate to and from the separator 502 to vary the amounts of steam flowing through each of lines 220 and 224 and the amount of condensate flowing as feed water to the low quality steam generator 406.

Although the embodiments of the HRSG 218 shown in FIGS. 4 and 5 implement two steam generators, other numbers of steam generators can be used, and additional streams of steam can be produced. For example, a single steam generator may be used with a single separator to generate a single stream of high quality steam. If low quality steam is desired in such a configuration, a valve can be selectively opened or shut to bypass the separator. Furthermore, more than two steam generators can be used in the HRSG 218. Example embodiments of an HRSG 218 having multiple steam generators are described, for example, in International Patent Application No. WO/2012-170114 entitled, "Methods and Systems for Providing Steam," published on Dec. 13, 2012, and incorporated herein by reference in its entirety. Moreover, the controller of the HRSG 218 can control the HRSG 218 to produce high quality steam in both steam streams 220 and 224 if, for example, a particular hydrocarbon thermal recovery process calls for the use of high quality steam.

Figure 6:
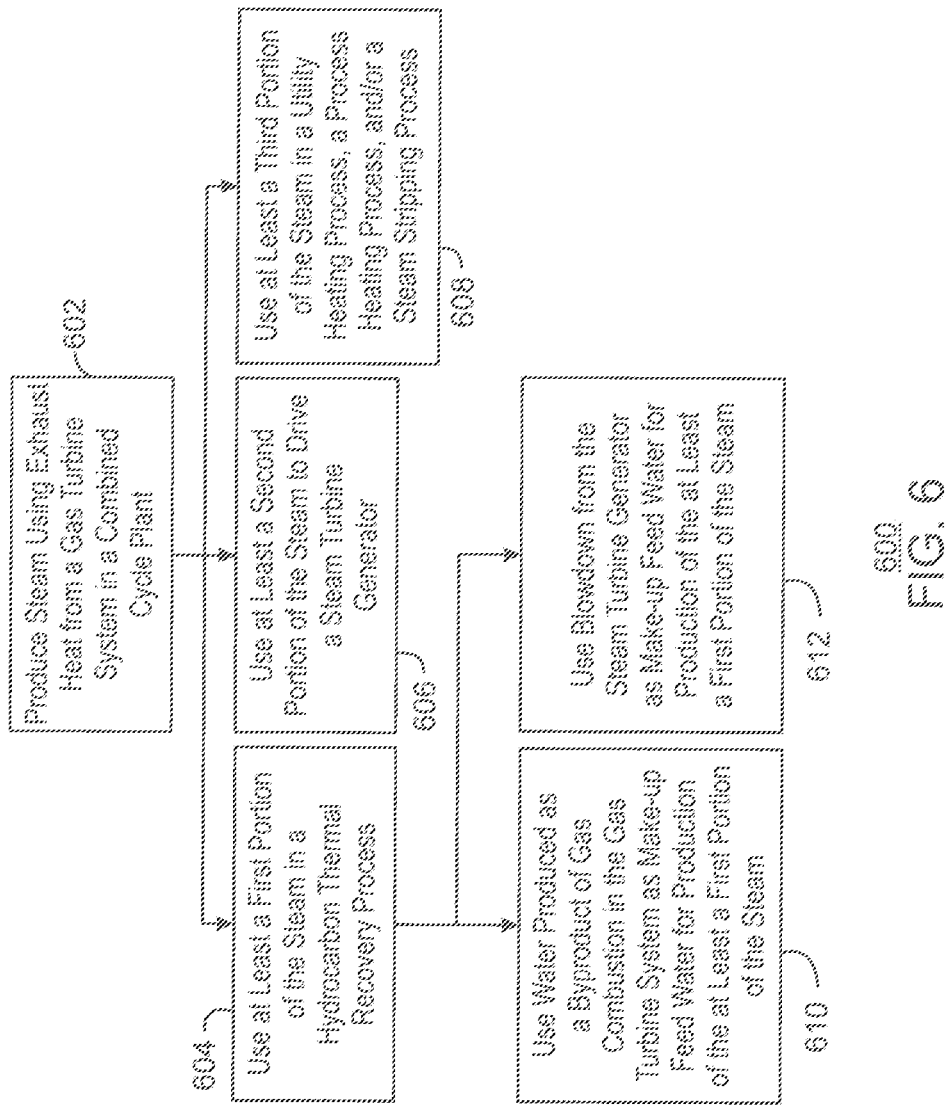
FIG. 6 is a process flow diagram of a method for using exhaust heat in a combined cycle plant.

Methods for Using Exhaust Heat from Combined Cycle Plant for Enhanced Oil Recovery FIG. 6 is a process flow diagram of a method 600 for using exhaust heat in a combined cycle plant. The method begins at block 602, at which exhaust heat from a gas turbine system in a combined cycle plant is used to produce steam. At block 604, at least a first portion of the produced steam is used in a hydrocarbon thermal recovery process. At block 606, at least a second portion of the produced steam is used to drive a steam turbine in the combined cycle plant.

At block 608, at least a third portion of the steam is used in another process such as a utility heating process, a process heating process, and/or a steam stripping process. Water produced as a byproduct of gas combustion in the gas turbine system is used as make-up feed water for production of the at least a first portion of the steam at block 610. Moreover, blowdown from the steam turbine is used as make-up feed water for production of the at least a first portion of the steam at block 612.

The process flow diagram of FIG. 6 is not intended to indicate that all the blocks of the method 600 shown in FIG. 6 are to be included in every case. Further, any number of additional blocks not shown in FIG. 6 may be included in the method 600, depending on the details of the specific implementation.

Figure 7:
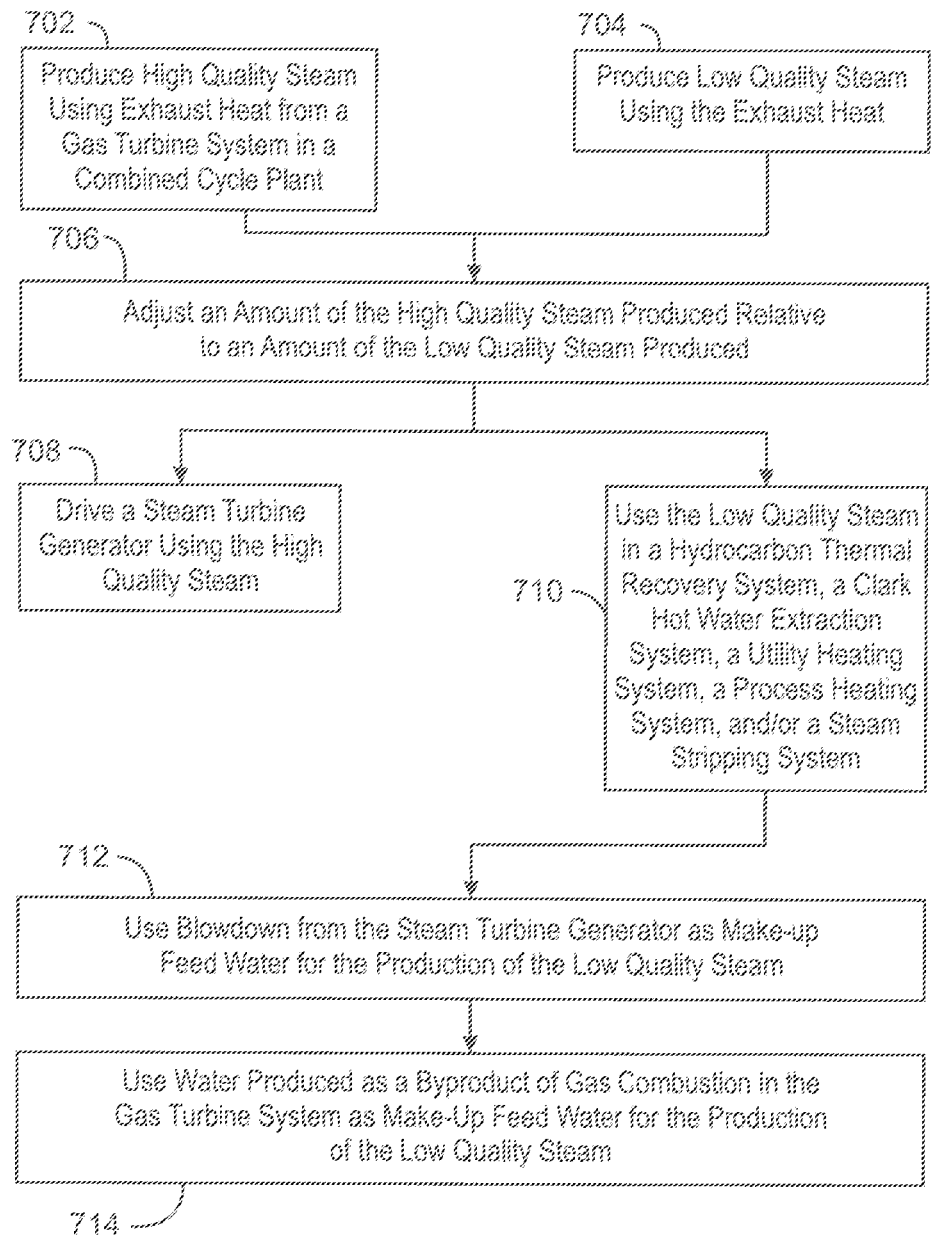
FIG. 7 is a process flow diagram of another method for using exhaust heat in a combined cycle plant.

FIG. 7 is a process flow diagram of another method 700 for using exhaust heat in a combined cycle plant. At block 702, high quality steam is produced using exhaust heat from a gas turbine system in a combined cycle plant. At block 704, low quality steam is also produced using the exhaust heat. An amount of the high quality steam produced relative to an amount of the low quality steam produced is adjusted at block 706.

At block 708, a steam turbine is driven using the high quality steam and, at block 710, the low quality steam is used in a thermal recovery system (e.g., by injecting the low quality steam into a reservoir to thermally recover viscous hydrocarbons in the reservoir), a Clark hot water extraction system, a utility heating system, a process heating system, and/or a steam stripping system. At block 712, blowdown from the steam turbine is used as make-up feed water for the production of the low quality steam. Water produced as a byproduct of gas combustion in the gas turbine system is used as make-up feed water for the production of the low quality steam at block 714.

The process flow diagram of FIG. 7 is not intended to indicate that all the blocks of the method 700 shown in FIG. 7 are to be included in every case. Further, any number of additional blocks not shown in FIG. 7 may be included in the method 700, depending on the details of the specific implementation.

Embodiments

Embodiments of the techniques may include any combinations of the methods and systems shown in the following numbered paragraphs. This is not to be considered a complete listing of all possible embodiments, as any number of variations can be envisioned from the description herein.

1. A method for generating steam for hydrocarbon production using a combined cycle power plant, including:
   producing steam using heat from an exhaust stream from a gas turbine system;
   condensing a water stream from combustion products in the exhaust stream; and
   using the water stream as a make-up water for production of the steam.
2. The method of paragraph 1, including:
   chilling the exhaust stream to condense a second water stream;
   combining the water stream and the second water stream to form a combined water stream; and
   using the combined stream as the make-up water.
3. The method of paragraphs 1 or 2, including using at least a portion of the steam to drive a steam turbine.
4. The method of paragraph 3, wherein the steam turbine produces additional shaft power on a shaft of the gas turbine system.
5. The method of paragraphs 3 or 4, wherein the steam turbine produces blowdown, and wherein the method includes using the blowdown as make-up water for production of the steam.
6. The method of any one of the preceding paragraphs, including using at least a portion of the steam in a thermal recovery process for hydrocarbons.
7. The method of paragraph 6, wherein the thermal recovery process is a cyclic steam stimulation process.
8. The method of paragraphs 6 or 7, wherein the thermal recovery process is a steam assisted gravity drainage process.
9. The method of paragraphs 6, 7, or 8, wherein the thermal recovery process is a Clark hot water extraction process.
10. The method of any one of paragraphs 3-9, wherein the steam turbine produces a blowdown stream, and wherein the method includes using the blowdown stream as make-up feed water for production of the steam used in a thermal recovery process.
11. The method of any one of the preceding paragraphs, including using at least a portion of the steam in a utility heating process, a process heating process, or a steam stripping process, or any combinations thereof
12. The method of any one of the preceding paragraphs, including recirculating the exhaust stream to the combustors as a diluent.
13. The method of paragraph 12, including extracting a portion of the diluent to offset the amount of fuel and oxidant added.
14. The method of paragraph 13, including separating the extracted portion of diluent into a carbon dioxide rich stream and a carbon dioxide lean stream.
15. The method of paragraph 14, including injecting the carbon dioxide rich stream into a hydrocarbon reservoir for enhanced oil recovery.
16. The method of paragraphs 14 or 15, including injecting the carbon dioxide rich stream into a subterranean formation for carbon sequestration.
17. The method of paragraphs 14, 15, or 16, including injecting the carbon dioxide lean stream into a hydrocarbon reservoir for pressure maintenance.
18. The method of any one of the preceding paragraphs, including treating the water stream prior to using the water stream as the make-up water.
19. The method of paragraph 18, including adjusting the pH of the water stream to between about 7 and about 9 pH units.
20. The method of paragraphs 18 or 19, including steam stripping the water stream to remove dissolved gases.
21. The method of paragraphs 18, 19, or 20, including treating the water stream with an oxygen scavenger.
22. The method of any one of the preceding paragraphs, including operating the gas turbine system using a substantially stoichiometric combustion process.
23. The method of any one of the preceding paragraphs, including generating a high quality steam and a low quality steam.
24. The method of paragraph 23, including using the high quality steam to drive a steam turbine.
25. The method of paragraph 23 or 24, comprising:
   obtaining reproduced water from a hydrocarbon thermal recovery system;
   treating the reproduced water; and
   using the reproduced water to produce the high quality steam or the low quality steam, or both.
26. The method of paragraphs 23, 24, or 25, including using the low quality steam in a thermal recovery process.
27. A method for using exhaust from a combined cycle plant in hydrocarbon production, including:
   producing steam using exhaust heat from an exhaust stream from a gas turbine system in the combined cycle plant;
   condensing a water stream from the exhaust stream;

using the water stream as a make-up stream for the steam production;
driving a steam turbine with at least a portion of the steam; and
injecting at least another portion of the steam into a hydrocarbon reservoir for a thermal recovery process.

28. The method of paragraph 27, wherein the portion of steam driving the steam turbine is adjusted based at least in part on a level of output power demanded from the combined cycle plant.

29. The method of paragraphs 27 or 28, wherein the thermal recovery process is cyclic steam stimulation.

30. The method of paragraph 27, 28, or 29, wherein the thermal recovery process is steam assisted gravity drainage.

31. The method of any one of paragraphs 27-30, including driving a steam turbine with the steam.

32. The method of paragraph 31, wherein the steam turbine produces additional shaft power on a shaft of the gas turbine system.

33. The method of paragraph 32, including:
producing a blowdown stream from the steam turbine; and
providing the blowdown stream as make-up feed water for the production of the steam.

34. The method of any one of paragraphs 27-33, including using the steam in a Clark hot water extraction system, a utility heating system, a process heating system, or a steam stripping system, or any combinations thereof 35. A system for generating power and thermally recovering hydrocarbons from a reservoir, including:
a gas turbine system configured to produce a hot exhaust stream as a byproduct of combustion;
a heat recovery steam generator (HRSG) configured to produce a steam stream using the hot exhaust stream, wherein the HRSG produces a condensate stream from the combustion products in the hot exhaust stream; and
a feed system configured to use the condensate stream as at least part of a make-up water provided to the HRSG to generate the steam stream.

36. The system of paragraph 35, including a steam turbine configured to use at least a portion of the steam stream to generate mechanical power.

37. The system of paragraphs 35 or 36, including an electrical generator driven by the mechanical power.

38. The system of paragraph 36, wherein the steam turbine produces additional shaft power on a shaft of the gas turbine system.

39. The system of any one of paragraphs 35-38, including a hydrocarbon production system configured to use a portion of the steam stream to thermally recover hydrocarbons from a reservoir.

40. The system of paragraph 39, including a cyclic steam stimulation system.

41. The system of paragraphs 39 or 40, including a steam assisted gravity drainage system.

42. The system of paragraphs 39, 40, or 41, including a Clark hot water extraction system.

43. The system of paragraph 35, including a water purification system for the condensate stream.

44. The system of paragraph 43, including a steam stripper configured to decrease dissolved gases in the condensate stream.

45. The system of paragraphs 43 or 44, including a pH adjustment system configured to bring the pH of the condensate stream to between about 7 and about 9 pH units.

46. The system of paragraphs 43, 44, or 45, including a filtration system.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for generating steam for hydrocarbon production, comprising:
substantially stoichiometrically combusting a compressed oxidant and a fuel in a combustion chamber in a gas turbine system in the combined cycle power plant, thereby generating an exhaust stream containing combustion products;
producing steam using heat from the exhaust stream;
injecting at least a portion of the steam into a hydrocarbon reservoir;
obtaining hydrocarbons and reproduced water from the hydrocarbon reservoir using a thermal recovery process;
condensing a water stream from the combustion products in the exhaust stream; and
using the water stream and at least a portion of the reproduced water as a make-up water for production of the steam.

2. The method of claim 1, comprising:
recirculating at least a portion of the exhaust stream to the combustion chamber as a diluent for combustion;
chilling the diluent prior to introduction into the combustion chamber to condense a second water stream;
combining the water stream and the second water stream to form a combined water stream; and
using the combined stream and the at least a portion of the reproduced water as the make-up water.

3. The method of claim 2, comprising extracting a portion of the diluent to offset the amount of fuel and oxidant added.

4. The method of claim 3, comprising separating the extracted portion of diluent into a carbon dioxide rich stream and a carbon dioxide lean stream.

5. The method of claim 4, comprising injecting the carbon dioxide rich stream into a hydrocarbon reservoir for enhanced oil recovery.

6. The method of claim 4, comprising injecting the carbon dioxide rich stream into a subterranean formation for carbon sequestration.

7. The method of claim 4, comprising injecting the carbon dioxide lean stream into a hydrocarbon reservoir for pressure maintenance.

8. The method of claim 1, comprising using at least a second portion of the steam to drive a steam turbine.

9. The method of claim 8, wherein the steam turbine produces additional shaft power on a shaft of the gas turbine system.

10. The method of claim 8, wherein the steam turbine produces blowdown, and wherein the method comprises using the blowdown as additional make-up water for production of the steam.

11. The method of claim 1, wherein the thermal recovery process is a cyclic steam stimulation process.

12. The method of claim 1, wherein the thermal recovery process is a steam assisted gravity drainage process.

13. The method of claim 1, wherein the thermal recovery process is a Clark hot water extraction process.

14. The method of claim 1, comprising using at least a portion of the steam in a utility heating process, a process heating process, or a steam stripping process, or any combinations thereof.

15. The method of claim 1, comprising treating the water stream prior to using the water stream as part of the make-up water.

16. The method of claim 15, comprising adjusting the pH of the water stream to between about 7 and about 9 pH units.

17. The method of claim 15, comprising steam stripping the water stream to remove dissolved gases.

18. The method of claim 15, comprising treating the water stream with an oxygen scavenger.

19. The method of claim 1, comprising generating a high quality steam comprising 90 wt % or more water vapor and a low quality steam comprising less than 90 wt % water vapor.

20. The method of claim 19, comprising using the high quality steam to drive a steam turbine.

21. The method of claim 19, comprising:
treating the reproduced water.

22. The method of claim 19, comprising using the low quality steam in the thermal recovery process.

23. A method for using exhaust from a combined cycle plant in hydrocarbon production, comprising:
substantially stoichiometrically combusting a fuel and an oxidant in a gas turbine system in the combined cycle plant to produce an exhaust stream;
producing steam using exhaust heat from the exhaust stream;
injecting at least a portion of the steam into a hydrocarbon reservoir;
obtaining hydrocarbons and reproduced water from the hydrocarbon reservoir using a thermal recovery process;
condensing a water stream from the exhaust stream;
using the water stream and at least a portion of the reproduced water as a make-up stream for the steam production; and
driving a steam turbine with at least a second portion of the steam.

24. The method of claim 23, wherein the portion of steam driving the steam turbine is adjusted based at least in part on a level of output power demanded from the combined cycle plant.

25. The method of claim 23, wherein the thermal recovery process is cyclic steam stimulation.

26. The method of claim 23, wherein the thermal recovery process is steam assisted gravity drainage.

27. The method of claim 23, comprising:
producing a blowdown stream from the steam turbine; and
providing the blowdown stream as additional make-up feed water for the production of the steam.

28. The method of claim 23, comprising using the steam in a Clark hot water extraction system, a utility heating system, a process heating system, or a steam stripping system, or any combinations thereof.

29. A system for generating power and thermally recovering hydrocarbons from a reservoir, comprising:
a gas turbine system configured to produce a hot exhaust stream as a byproduct of substantially stoichiometric combustion of a compressed oxidant and a fuel;
a heat recovery steam generator (HRSG) configured to produce a steam stream using the hot exhaust stream, wherein the HRSG delivers at least a portion of the steam stream to the thermal recovery system and produces a condensate stream from the combustion products in the hot exhaust stream;
a hydrocarbon thermal recovery system configured to use at least a portion of the steam stream in a thermal recovery process and produce hydrocarbons and reproduced water; and
a feed system configured to use the condensate stream and at least a portion of the reproduced water as make-up water provided to the HRSG to generate the steam stream.

30. The system of claim 29, comprising at least one of:
(a) a steam turbine configured to use at least a second portion of the steam stream to generate mechanical power cyclic steam stimulation system, wherein the steam turbine produces additional shaft power on a shaft of the gas turbine system;
(b) an electrical generator driven by the mechanical power;
(c) a steam assisted gravity drainage system;
(d) a Clark hot water extraction system;
(e) a water purification system for the condensate stream;
(f) a steam stripper configured to decrease dissolved gases in the condensate stream;
(g) a pH adjustment system configured to bring the pH of the condensate stream to between about 7 and about 9 pH units; and
(h) a filtration system.

* * * * *